Aug. 7, 1945.  H. E. HOYT  2,381,055
PURIFICATION OF GLYCERIN
Filed May 18, 1943
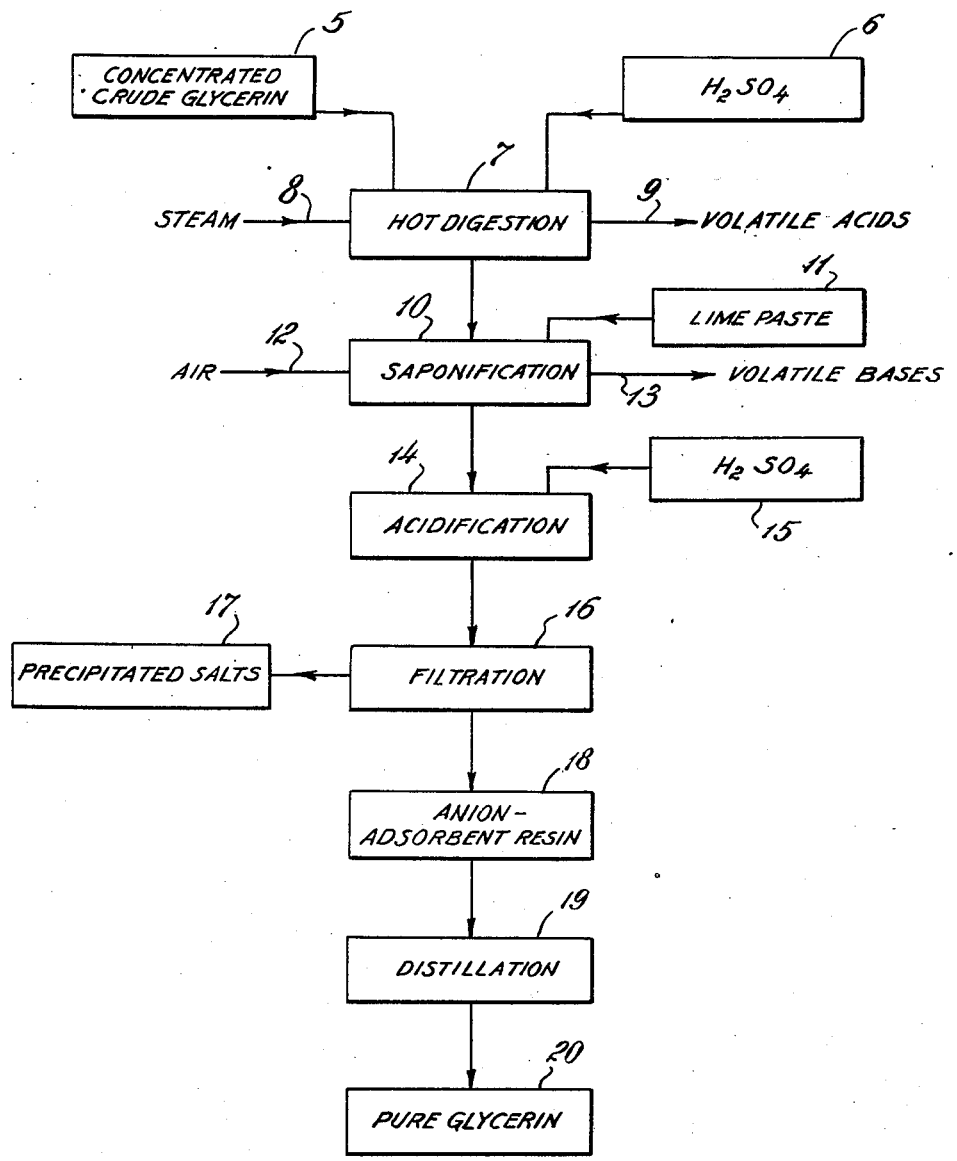
INVENTOR.
Howard E. Hoyt
BY
ATTORNEYS Patented Aug. 7, 1945

2,381,055

UNITED STATES PATENT OFFICE 2,381,055

PURIFICATION OF GLYCERIN

Howard E. Hoyt, Stamford, Conn., assignor to U. S. Industrial Chemicals, Inc., New York, N. Y., a corporation of Delaware Application May 18, 1943, Serial No. 487,444

5 Claims. (Cl. 260—637)

This invention relates to the purification of glycerin and particularly to the recovery of glycerin free from acid, saponifiable matter and other impurities from crude glycerin obtained by fermentation and particularly from a residue commonly known as distillery slop.

The recovery of glycerin from fermentation operations has been the subject of much investigation, but the solution of the problem is difficult owing to the presence of large quantities of extraneous material from which the glycerin must be separated. An effective method of separating a water solution of glycerin from distillery slop is described in the application of Wolcott Dennis Serial No. 408,837, filed August 29, 1941. According to the method described in that application, the distillery slop is sprayed into a stream of inert gas at an elevated temperature. The solids formed by evaporation are separated and the glycerin solution is condensed from the vapors. The aqueous glycerin solution contains ordinarily about 25% or more by weight of glycerin. In addition to water, the solution contains some free acid, considerable saponifiable matter (esters or combined acids) and other impurities. Repeated experiments have demonstrated that the usual procedure of heating the glycerin solution with a soluble alkali such as sodium hydroxide followed by distillation of the alkaline solution does not prevent the occurrence of free acid in the distilled glycerin.

It is the object of the invention to provide a practical and commercially applicable method of purifying crude glycerin solutions containing free acids and saponifiable matter whereby the undesirable contaminating materials are substantially eliminated and pure glycerin of a satisfactory commercial quality is obtained.

Other objects and advantages of the invention will be apparent as it is better understood by reference to the following specification and the accompanying drawing, showing a flow sheet which illustrates the procedure.

I have discovered that crude glycerin solutions containing free acid, saponifiable matter and other impurities may be treated successfully to recover pure glycerin therefrom by the procedure hereinafter described. The procedure includes a series of steps. After preliminary concentration by evaporation if necessary, the glycerin solution is subjected to hot digestion with sulphuric acid. This treatment removes certain impurities which may contaminate the product to an extent which will prevent it from passing the standard test for carbonizable impurities in U. S. Pharmacopoeia XI. Following the treatment with sulphuric acid, I add sufficient lime to neutralize all free acids and to provide an excess for the purpose of saponifying the combined acids. After saponification, the solution is acidified with sulphuric acid to precipitate the lime as calcium sulphate which is removed by filtration. At this point any acid present will be in the form of free acid. This is removed by treating the solution with an acid-adsorbing synthetic resin. Finally, the solution is distilled to recover glycerin free from acid and saponifiable matter.

The procedure will be readily understood by reference to the drawing, in which 5 and 6 indicate the sources of supply of concentrated crude glycerin and sulphuric acid which are added in proper proportions and subjected to hot digestion as indicated at 7. Steam may be introduced at 8, and the volatile acids resulting from the digestion are removed at 9. The introduction of steam is, however, optional. I prefer to employ commercial concentrated sulphuric acid. From 5% to 15% by weight of the glycerin present is usually required. 10% by weight of the glycerin present normally ensures a satisfactory reaction, and the effective separation of the impurities which can be removed at this stage of the process. A temperature of 140° C. is satisfactory in this operation, although considerable variation is possible.

Following the initial step, the solution is delivered to the saponifier 10 and lime, usually in the form of lime paste prepared with water, is introduced from a source 11 in quantity sufficient to neutralize the acid and to afford sufficient excess to saponify the combined acids which may be present. The amount required will vary, of course, and may be readily calculated after determination of the amount of acid and saponifiable matter which is present in the solution. The mixture is maintained at an appropriate temperature, for example about 110° C. The temperature is not critical. Air is introduced at 12 and volatile bases resulting from saponification are withdrawn at 13.

When saponification has been completed, the mixture is cooled and at 14 is subjected to acidification with sulphuric acid from a source 15. It is preferable to acidify until the solution has a pH of approximately 3. After thorough mixing to ensure complete reaction, the mixture is filtered at 16, the precipitated salts, principally calcium sulphate, being separated as the filter cake at 17.

The filtrate is then subjected to an anion-adsorbent resin at 18. Several such resins are known. They are in general the product of condensation of organic amines or similar basic materials with formaldehyde. One known as "Anex" is believed to be a melamine resin since it contains about 33% nitrogen. Another, "Amberlite IR-4" is the product of condensation of organic amines such as aniline with formaldehyde. The invention is not limited to the use of these particular products, as any resin having anion-adsorption activity can be used to accomplish the purpose. The treatment may consist of passing the solution through a suitable column or other receptacle containing pieces of the resin of a size adapted to ensure substantial surface contact. When the resin has been depleted, it may be revivified readily by first washing it and then passing an aqueous solution of sodium carbonate through the column. After rinsing with water, the resin with its activity renewed may be employed for the further treatment of glycerin solutions.

The solution, finally freed from acid by the action of the anion-adsorbent resin, is distilled at 19, and the pure glycerin is separated at 20.

As an example of the invention, 12.9 kilograms of a crude glycerin solution obtained by the method of the Dennis application Ser. No. 408,837 contained by analysis about 3.01 kilograms of glycerin together with free acid and saponifiable matter equivalent respectively to 64.2 cc. and 228.0 cc. of normal alkali per 100 grams of glycerin. This was first concentrated until enough water had been removed to leave a solution containing about 60% by weight of glycerin. The solution was first treated with 10 parts by weight of concentrated sulphuric acid for every 100 parts by weight of glycerin and heated to 140° C. while a current of steam was passed through the solution. Thereafter the solution was mixed with 384 grams of lime in the form of a paste with water, and the mixture was heated to about 110° C. while a stream of air was passed through the solution. The mixture was then cooled and sulphuric acid was added until the solution indicated a pH of 3. The precipitate was then removed by filtration. The filtrate was passed through a bed consisting of small pieces of "Anex" equivalent to 1.2 liters in volume. The free acids present were adsorbed by the resin, and the effluent glycerin contained neither free nor combined acids. Upon distillation of the filtrate after treatment with "Anex," 2.32 kilograms of a product having a glycerin content of 97.9% by weight were obtained. The over-all recovery of glycerin in the main fraction, heads, foots and sweetwater, was approximately 91% of the amount contained in the starting material.

The procedure as described affords a simple and effective method of recovering glycerin of commercial quality from crude raw material. The apparatus required is of the type normally found in plants adapted for chemical treatment of materials and consequently it is not described in detail.

Various changes may be made in the details of the procedure without departing from the invention or sacrificing the advantages thereof.

I claim:

1. The method of purifying a concentrated glycerin solution obtained from fermentation residues and containing free acids and saponifiable matter, which comprises digesting such concentrated glycerin solution with sulphuric acid at a temperature sufficiently high to cause the sulphuric acid to react with contaminants present in the glycerin solution, mixing the resulting solution with a sufficient amount of an alkaline-earth metal compound to neutralize free acid present and to saponify combined acids, adding sulphuric acid to the solution of such neutralization and saponification treatment to precipitate alkaline-earth metal present as the sulphate, separating the precipitated sulphate, subjecting the remaining solution to an anion adsorbing resin to eliminate acid present therein, and finally distilling the solution to recover glycerin free from acid and saponifiable matter.

2. The method of purifying a glycerin solution containing not less than about 60% by weight of glycerin obtained from fermentation residues and containing free acids and saponifiable matter which comprises digesting such glycerin solution with sulphuric acid at a temperature sufficiently high to cause the sulphuric acid to react with contaminants present in the glycerin solution, mixing the resulting solution with a sufficient amount of an alkaline-earth metal compound to neutralize free acid present and to saponify combined acids, adding sulphuric acid to the solution of such neutralization and saponification treatment to precipitate alkaline-earth metal present as the sulphate, separating the precipitated sulphate, subjecting the remaining solution to an anion adsorbing resin to eliminate acid present therein, and finally distilling the solution to recover glycerin free from acid and saponifiable matter.

3. The method of purifying a concentrated glycerin solution obtained from fermentation residues and containing free acids and saponifiable matter, which comprises digesting such concentrated glycerin solution with sulphuric acid at a temperature of about 140° C. whereby the sulphuric acid is caused to react with contaminants present in the glycerin solution, mixing the resulting solution with a sufficient amount of an alkaline-earth metal compound to neutralize free acid present and to saponify combined acids, adding sulphuric acid to the solution of such neutralization and saponification treatment to precipitate alkaline-earth metal present as the sulphate, separating the precipitated sulphate, subjecting the remaining solution to an anion adsorbing resin to eliminate acid present therein, and finally distilling the solution to recover glycerin free from acid and saponifiable matter.

4. The method of purifying a concentrated glycerin solution obtained from fermentation residues and containing free acids and saponifiable matter, which comprises digesting such concentrated glycerin solution with sulphuric acid in amount equal to about 5% to 15% of the weight of the glycerin of the solution and at a temperature sufficiently high to cause the sulphuric acid to react with contaminants present in the glycerin solution, mixing the resulting solution with a sufficient amount of an alkaline-earth metal compound to neutralize free acid present and to saponify combined acids, adding sulphuric acid to the solution of such neutralization and saponification treatment to precipitate alkaline-earth metal present as the sulphate, separating the precipitated sulphate, subjecting the remaining solution to an anion adsorbing resin to eliminate acid present therein, and finally distilling the solution to recover glycerin free from acid and saponifiable matter.

5. The method of purifying a concentrated glycerin solution obtained from fermentation residues and containing free acids and saponifiable matter, which comprises digesting such concentrated glycerin solution with sulphuric acid at a temperature sufficiently high to cause the sulphuric acid to react with contaminants present in the glycerin solution, mixing the resulting solution with a sufficient amount of an alkaline-earth metal compound to neutralize free acid present and to saponify combined acids, adding sulphuric acid to the solution of such neutralization and saponification treatment until the acidity thereof is brought to a pH of about 3 to precipitate alkaline-earth metal present as the sulphate, separating the precipitated sulphate, subjecting the remaining solution to an anion adsorbing resin to eliminate acid present therein, and finally distilling the solution to recover glycerin free from acid and saponifiable matter.

HOWARD E. HOYT.